United States Patent
Gillihan et al.

(10) Patent No.: US 6,842,262 B1
(45) Date of Patent: Jan. 11, 2005

(54) ICONIC PRINTER INTERFACE PROVIDING DOCUMENT COMPOSITION FEATURES

(75) Inventors: Thomas M. Gillihan, Portland, OR (US); Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 848 days.

(21) Appl. No.: 09/149,408

(22) Filed: Sep. 8, 1998

(51) Int. Cl.[7] .............................................. G06F 15/00
(52) U.S. Cl. ...................... 358/1.15; 358/1.18; 358/452
(58) Field of Search ........................ 358/1.1, 1.6, 1.13, 358/1.14, 1.15, 1.18, 1.19, 452, 537; 345/346, 348, 434, 835, 837, 838; 707/517, 522, 523, 525, 530; 399/184, 182, 183, 204

(56) References Cited

U.S. PATENT DOCUMENTS

| | | | |
|---|---|---|---|
| 4,965,771 A | | 10/1990 | Morikawa et al. .......... 358/1.13 |
| 4,968,159 A | | 11/1990 | Sasaki et al. .................. 400/76 |
| 5,036,476 A | | 7/1991 | Yamaguchi et al. ......... 364/519 |
| 5,060,135 A | | 10/1991 | Levine et al. ................ 364/200 |
| 5,165,014 A | | 11/1992 | Vassar ........................ 358/1.13 |
| 5,226,112 A | | 7/1993 | Mensing et al. ............ 358/1.15 |
| 5,228,118 A | | 7/1993 | Sasaki ......................... 358/1.13 |
| 5,301,262 A | * | 4/1994 | Kashiwagi .................. 358/1.18 |
| 5,303,336 A | | 4/1994 | Kageyama et al. ......... 358/1.15 |
| 5,402,527 A | | 3/1995 | Bigby et al. .................. 358/1.1 |
| 5,475,801 A | | 12/1995 | Brindle et al. .............. 358/1.15 |
| 5,495,561 A | * | 2/1996 | Holt ........................... 358/1.15 |
| 5,592,683 A | | 1/1997 | Chen et al. ..................... 710/52 |
| 5,634,091 A | * | 5/1997 | Sands et al. ................ 358/1.18 |
| 5,751,286 A | * | 5/1998 | Barber et al. ................ 345/348 |
| 6,067,554 A | * | 5/2000 | Hohensee et al. ........... 707/527 |
| 6,097,389 A | * | 8/2000 | Morris et al. ................ 345/346 |
| 6,201,548 B1 | * | 3/2001 | Cariffe et al. ............... 345/434 |
| 6,262,732 B1 | * | 7/2001 | Coleman et al. ............ 345/835 |

* cited by examiner

Primary Examiner—Mark Wallerson
(74) Attorney, Agent, or Firm—Chernoff, Vilhauer, McClung & Stenzel, LLP

(57) ABSTRACT

A printing interface is provided for a computer system that includes an application program for creating original multi-page electronic documents and a printing device for reproducing those documents. The printing interface has facilities for receiving a copy of the original electronic document and a user interface enabling the computer user to apply formatting changes to a selected page or groups of pages of the copy free from changing the original electronic document and to print the copy with those formatting changes. Provisions are made for automatic disposal of the copy and resetting the formatting options to the default settings when a second document is sent to the printing interface. In an alternative embodiment, the electronic document is printed to an intermediate metafile format in the printing interface and can be stored or printed.

11 Claims, 6 Drawing Sheets

ICONIC PRINTER INTERFACE PROVIDING DOCUMENT COMPOSITION FEATURES

BACKGROUND OF THE INVENTION

The present invention relates to a user interface for a computer system and, more particularly, to a printing interface enabling printer applied formatting to be conveniently incorporated into printed documents.

One of the most important capabilities of computer systems is the ability to reproduce "electronic documents," created and stored in the computer, as hard copy or printed output. Computer printers are capable of print quality rivaling that of traditional printing methods and can incorporate advanced printing operations to facilitate the assembly of the printed output into complex documents. However, the distributed nature of the software architecture of computer systems can make certain document formatting tasks complicated and awkward.

The hardware of a computer system is modular in nature, comprising a central processing unit with attached input, output, and storage devices. The input, storage, and output devices, such as printers, are available from a number of manufacturers and incorporate various operating mechanisms and optional features. To permit components with disparate specifications and internal construction to operate together, the computer system's software is distributed through several programs that are designed to interact while maintaining a level of isolation from each other. The physical operation of the modular input, output, and storage devices is controlled by specialized software, known collectively as device drivers, designed to enable other programs installed on the computer to work with a particular device without concern for the specifics of the device's hardware or internal language. The device drivers are stored separately and interact with the computer's operating system, the program that coordinates and manipulates the hardware and organizes the storage of files.

Electronic documents are data files created in application programs. Application programs such as word processing, spreadsheet, database, and drawing programs provide an interface between the user and the computer permitting the user to input, organize, and manipulate data to accomplish some task. Application programs provide extensive facilities for formatting electronic documents created in the application. These capabilities include the page formatting elements of style and presentation; such as margins, indents, and different sizes, weights, and styles of type; and division of the document into logical pages. To reduce their size and complexity, application programs are also modular in nature.

Output or storage of an electronic document requires that the application program interact with the operating system which, in turn, interacts with the device driver that controls the physical operation of the output or storage device. To print a document, the user invokes the print command in the user interface of the application program. An application program print interface will be accessed enabling the user to direct the printer to produce the printed output. A typical graphical, application program print user interface is illustrated in FIG. 1. In the case of the application program print user interface of FIG. 1, mouse clicking "OK" directs the computer system to print the document. A copy of the electronic document, with its formatting instructions, is forwarded to the operating system as a print job. The operating system and the printer driver, the device driver for the attached printer, convert the data stream that comprises the print job to electric control signals that are necessary to drive the printing mechanism of the printer and produce printed output.

A typical application program print interface also makes available a limited number of printing options. Since the application program must work with a number of printers the options available at the application program-print interface are limited to a few standardized options, such as selecting the number of copies or selecting some part of the document to be printed.

Printers can be equipped to perform a number of printing operations beyond the simple conversion of an electronic page of text or graphics to a printed page. Selection of printing stock; printing in duplex (two-side) or simplex (single-side) mode; modification of page layout by mirroring, rotating, negating or zooming; printing multiple pages on a single sheet of paper; grouping or sorting and stapling collated pages are examples of the special printing operations available with certain printers. These special printing operations alter the operation of the printer's printing and paper handling mechanisms to produce the changes necessary to convert the formatted electronic document to the printed output with the desired printer applied formatting. Selection of these special printing operations and their application to a document is through a user interface for the printer driver. In the application program print user interface of FIG. 1 the user can access the printer driver interface by selecting the "printer" button. FIG. 2 is an example of a printer driver user interface with tabbed, layered subwindows for specific special operations. Since these special printing operations alter the operation of the printer's mechanism, the selected operations will apply to the entirety of the print job as it delivered to the operating system and will persist for each subsequent print job until the user accesses the printer driver user interface and resets the options.

Since the formatting of the electronic document and the operation of the printer's mechanism to produce the special printing operations are controlled by separate programs some desirable printing operations are difficult and may not be possible without modifying the original electronic document from the application program. For example, inserting a blank page in an "as printed" document requires the user to insert a blank page in the original electronic document from the application program. Or, if the user desires to apply duplex printing to only part of the document it would necessary to select multiple ranges of pages in the application program and print each selection separately or divide the original electronic document into two or more documents and print each separately. In either case, manual collation would be necessary for multiple copies.

While the electronic document can be altered to accomplish these document composition operations, it is awkward to do so and, in some cases, printing the same electronic document for assembly in more than one way may be desirable. For example, a draft of a document might be printed for review without incorporating the special operations desired for assembly into the final published form. Selecting and deselecting printer options is awkward requiring the user to sort through several menus and selection choices and to remember how each selection is accessed and what printer options are currently selected.

Distributing the computer system's software through several programs has increased the number of hardware options that are useable in building a system but it creates some operating inefficiencies and disincentives to alleviating these inefficiencies. The printer driver is supplied by the printer vendor and written for the specific printer. Since the printer driver contains the software necessary for utilizing the special printing operations available with the specific printer and a user interface, the printer driver interface, the printer vendor is likely to see any inefficiency in using the printer driver as an application specific problem. On the other hand, the application program is usually supplied by a party, other than the printer supplier, that specializes in that type of software. Improving the efficiency of the interface between the application program and the wide variety of printer drivers is difficult and is likely to be seen as a printer specific problem.

What is desired is a user interface that will easily enable the user to apply non-persistent formatting changes, useful in composing the printed output, to individual pages or groups of pages of an electronic document without altering the original electronic document.

SUMMARY OF THE INVENTION

The present invention overcomes the aforementioned drawbacks in the prior art by providing a printing interface for a computer system that includes an application program for creating original multi-page electronic documents and a printing device. The printing interface has facilities for receiving a copy of the original electronic document and a user interface enabling the computer user to apply formatting changes to a selected page or group of pages of that copy free from changing the original electronic document and to print the copy with those formatting changes. In a preferred embodiment a garbage collector removes the copy of the original electronic document and returns the formatting selections to default settings when a second document is selected for printing. In an alternative preferred embodiment of the printing interface, the original electronic document is copied to an intermediate metafile to which formatting changes can be applied and which can be printed by the printing device or stored in the computer system.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENTS

The present invention provides a printing interface for a computer system that includes an application program for creating original multi-page electronic documents and a printing device. The printing interface has facilities for receiving a copy of the original electronic document and a user interface enabling the computer user to apply formatting changes to a selected page or group of pages of that copy free from changing the original electronic document, and to print the copy with those formatting changes.

Figure 1:
FIG. 1 illustrates an application program print interface.
Figure 2:
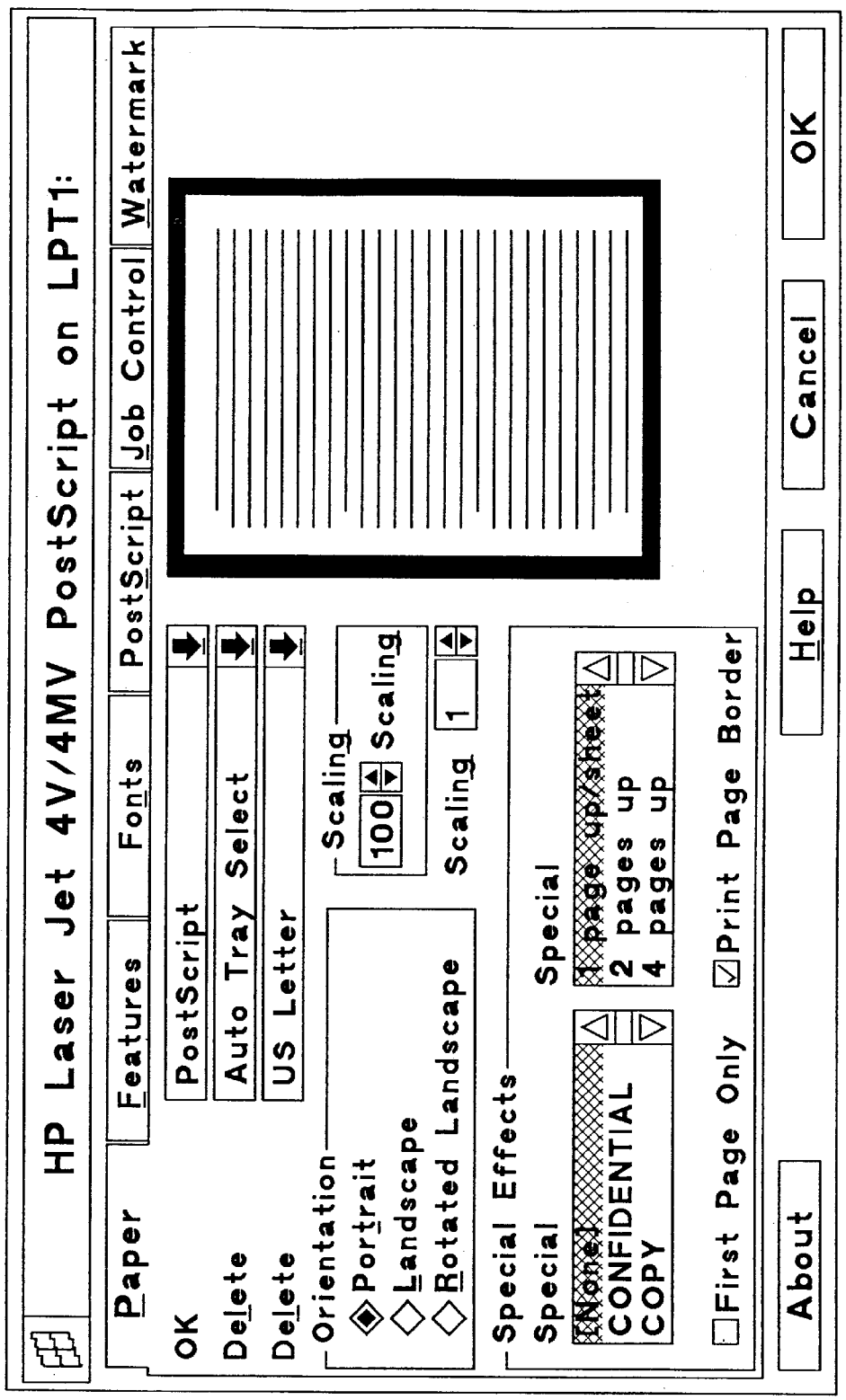
FIG. 2 illustrates a printer driver user interface.
Figure 3:
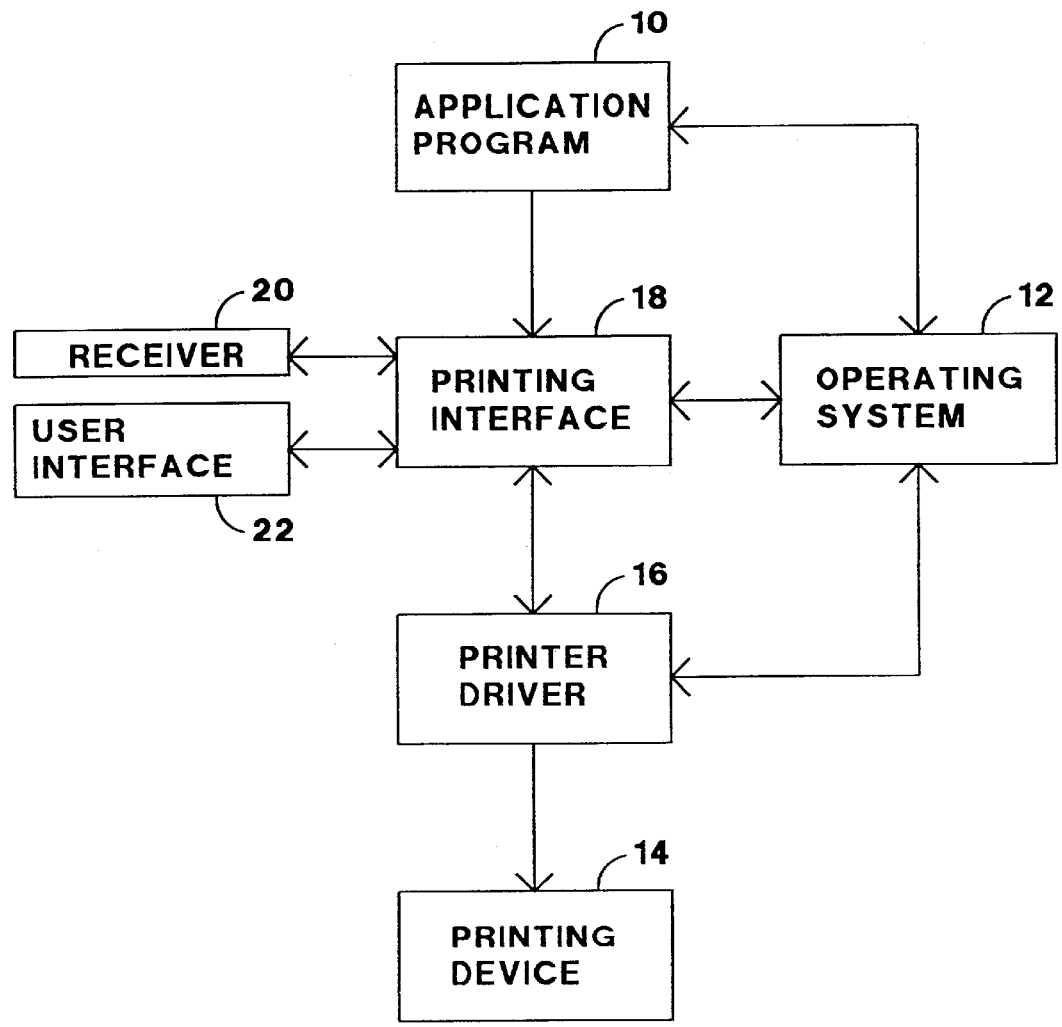
FIG. 3 is a block diagram of a computer system that includes the printing interface.

Referring to FIG. 3, a computer system having an application program 10 provides a user interface enabling the user to input, manipulate and output data to facilitate the user's creation of files or "electronic" documents. Typical application programs include word processing, spreadsheet, database and drawing programs. To produce a printed copy of the electronic document the user invokes the "PRINT" command in the application program print interface. The application program calls the facilities of the operating system 12, the software that coordinates the physical operation of the computer system, including attached peripheral devices, such as a printing device 14 or a mouse. The physical operation of the printing device is controlled by specialized software known as a printer driver 16, which is accessed by the operating system 12.

Figure 4:
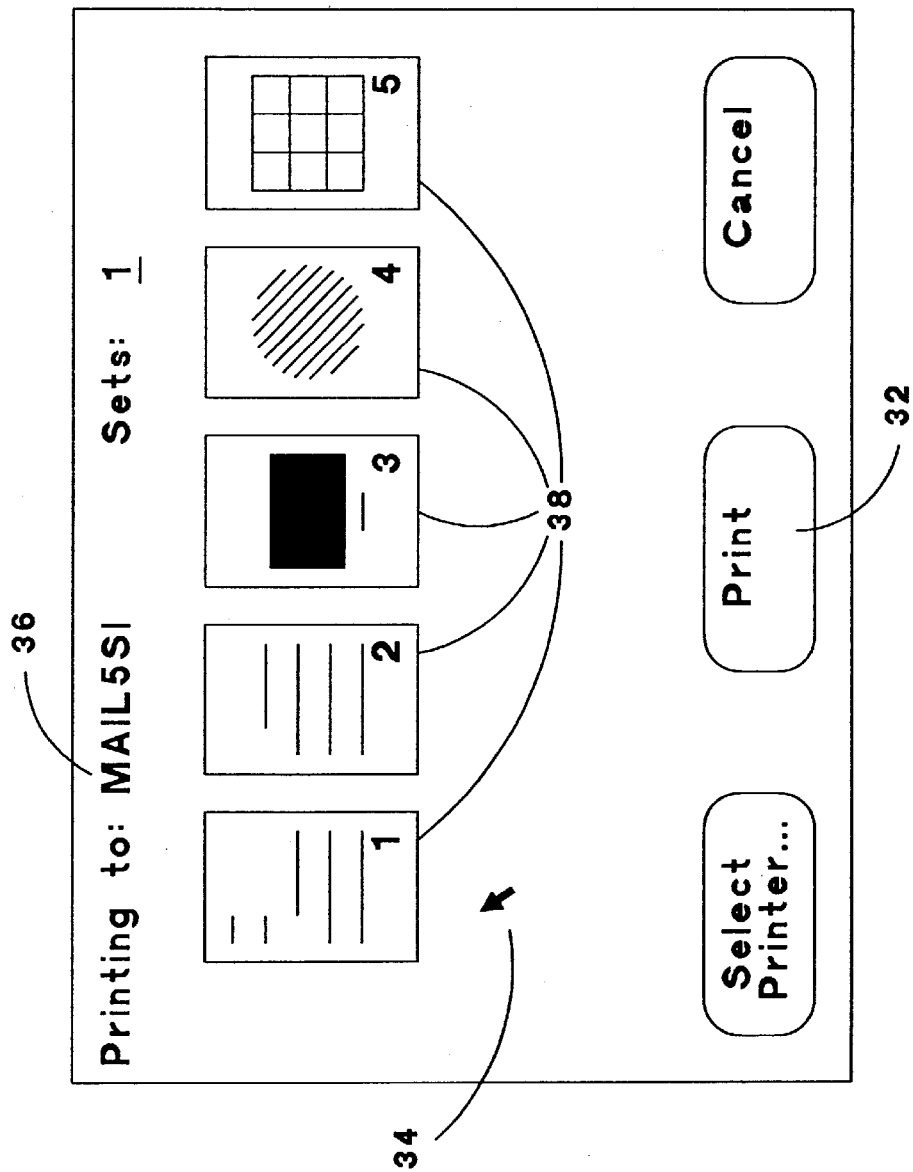
FIG. 4 illustrates an exemplary embodiment of a user interface window for the present invention.

The printing interface 18 of the present invention is operationally interposed between the application program 10 and the printer driver 16. It comprises a receiver 20 to receive a copy of the original electronic document from an application program and a user interface 22 to enable the user to apply formatting changes to selected pages, but not necessarily all pages, of the copy. When the user selects the print operation in the application program, the printing interface displays a window, such as that illustrated in FIG. 4. If the user selects the "PRINT" button 32 with the mouse pointer 34 the electronic document will be passed to the operating system and printed by the printing device designated in the window 36. However, the user can apply formatting alterations to the document or selected pages of the document before printing.

Figure 5:
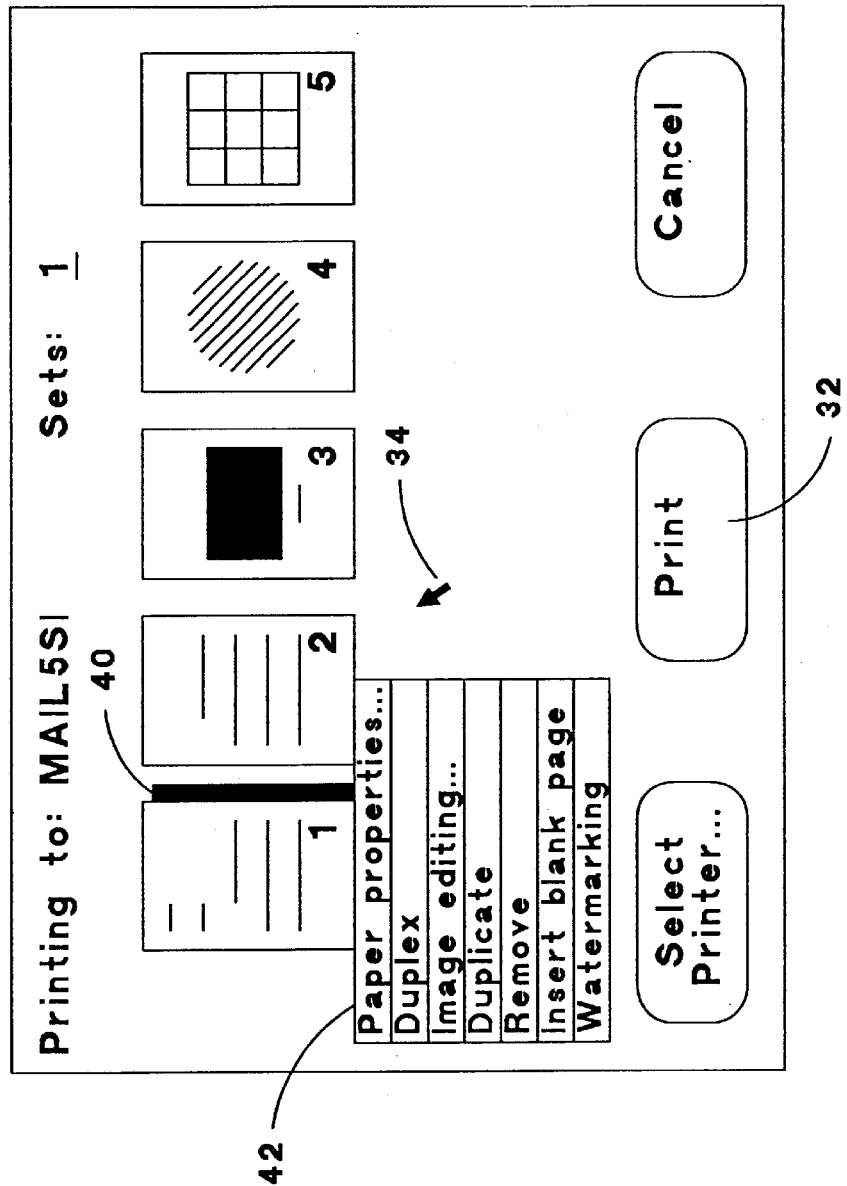
FIG. 5 illustrates a user interface window for the printing interface of FIG. 4 with a pop-up menu.

Thumbnail images 38 of the individual logical pages of a multi-page electronic document are displayed in the user interface window. The user can select a page or group of pages within the document using the mouse pointer 34 and appropriate keyboard or mouse button commands. When a page or group of pages is selected 40, a menu 42 and pop-up submenus appear, listing formatting changes that can be applied to the selected page, see FIG. 5. Exemplary options might include the properties of the paper for the printed output, choosing between for example, plain, letterhead or colored paper or paper of alternate sizes. Duplex (two-sided) printing might be selected for some pages of the document and simplex (one-sided) printing for the remainder of the document. Image editing operations, such as mirroring an image, rotation, negation of image and zoom, are examples of special printing operations which are useful in document assembly and might be accessed from the printing interface and applied to selected pages. In addition, the interface could provide for multiple copies of selected pages, n-up printing, guttering, pages which are not printed, insertion of blank pages into the printed output or overlaying of a user specified watermark on selected pages within the document.

Figure 6:
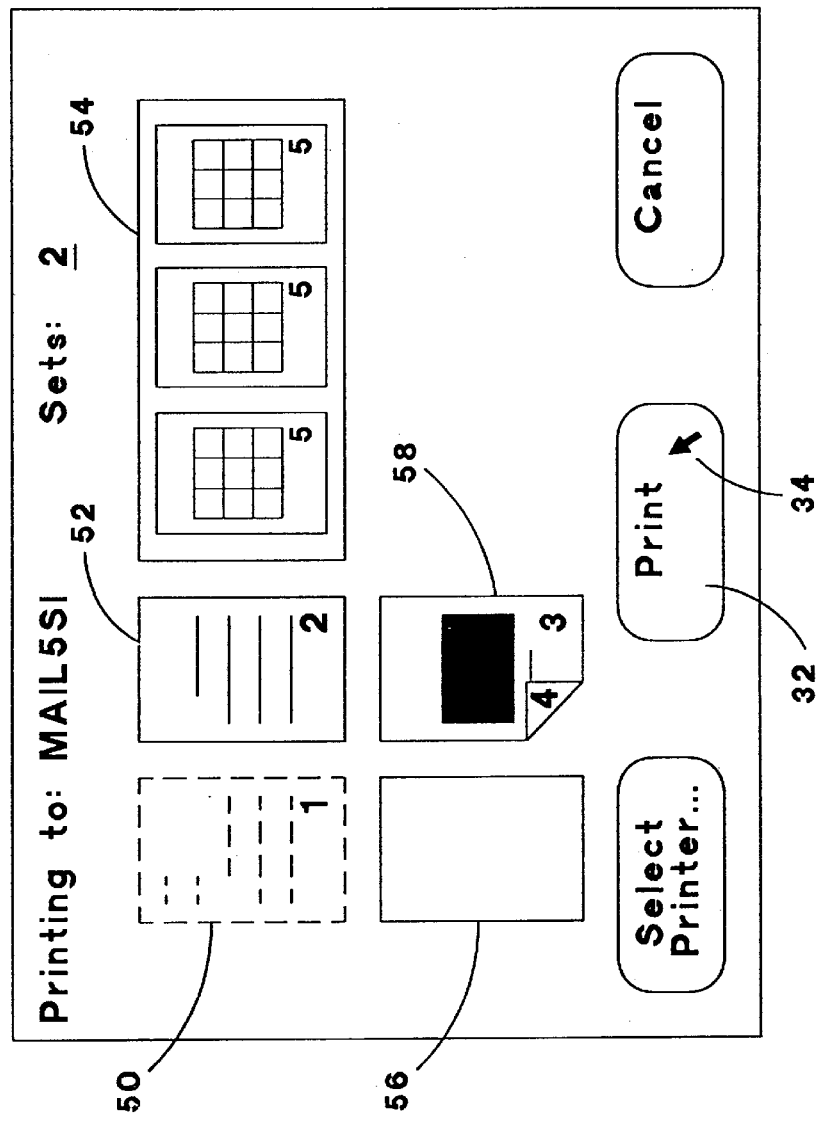
FIG. 6 is an exemplary window for the printing interface of FIG. 4 illustrating icons for selected optional operations.

By way of illustration, FIG. 6 indicates how the printing interface window might look when a number of special printing operations have been selected for application to a document. Icons represent the operations that are to be applied to the selected pages. For example, the icons indicate that different types of paper, letterhead for page 1 50 and standard letter stock for page 2 52, have been selected for the first two pages. These pages are too be followed by three copies of page 5 printed on 11×17 inch paper 54 which is, in turn, followed by a blank sheet of standard letter stock 56. Finally, an icon 58 indicates that pages 3 and 4 are to be duplex printed on standard letter stock. Moving the page images or the formatting icons applicable to the logical pages has changed the order in which the pages are to be printed.

The printing interface applies the formatting changes to a copy of the document that is passed to it by the application program in which it was created. The original electronic document is not altered and can be used in the composition of other printed output without the need to remove the formatting changes made for an earlier printing. In a first embodiment, when the user directs the printing of a second document, a garbage collector automatically discards the copy of the first document with the added formatting changes and resets the options in the printing interface to the default settings. Unlike changes made through the printer driver user interface, any changes to the printer's operation through the printing interface would not persist for subsequent documents.

Preferably, the printing interface is designed for a particular printer to include functions matching the capability of that printer. For example, if the printer has duplexing then the printing interface should include duplexing. Alternatively, if the printer is not capable of duplexing then the printing interface should not include the duplexing function. Many functions are generic to nearly all printers and should be included in the printing interface regardless of the particular printer. If desired, the printing interface may be designed suitable for all anticipated printers.

In an alternative embodiment, the electronic document can be printed from an application program to an intermediate metafile that is stored in memory. The printing interface can act as a stand-alone application program opening and closing the intermediate files; adding formatting changes and translating the metafile format to the specific page description language required by the designated printer.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A printing interface for a computer system having an application program for creating an original electronic document having a plurality of pages and a printing device for producing printed output, said printing interface comprising:
   (a) a receiver receiving a copy of said original electronic document; and
   (b) a user interface comprising a graphical display of an image for a plurality of pages of said original document and enabling a user to apply formatting changes to less than all of said plurality of pages of said copy including grouping pages of said copy by manipulating said images of said pages free from changing said original electronic document and to cause said printing device to print said plurality of pages of said copy.

2. A printing interface for a computer system having an application program for creating an original electronic document having a plurality of pages and a printing device for producing printed output, said printing interface comprising:
   (a) a receiver receiving a copy of said original electronic document; and
   (b) a user interface enabling a user to apply formatting changes to less than all of said plurality of pages of said copy free from changing said original electronic document and to cause said printing device to print said plurality of pages of said copy with said formatting changes, said user interface comprising a graphical display of an icon representing a page of said original document to which a formatting change has been applied through said user interface.

3. A printing interface for a computer system having an application program for creating an original electronic document having a plurality of pages and a printing device for producing printed output, said printing interface comprising:
   (a) a receiver receiving a copy of an original electronic document;
   (b) a user interface enabling a computer user to apply formatting changes to less than all of said pages of said copy free from changing said original electronic document and to cause said printing device to print at least a portion of said copy with said formatting changes; and
   (c) a garbage collector to remove said copy of said original document with said formatting changes from the computer system and reset the options for said formatting changes to their default values.

4. The printing interface of claim 3 wherein said user interface enables said computer user to group a plurality of said pages of said copy of said original electronic document.

5. The printing interface of claim 3 wherein said user interface further comprises a graphical display of an image of each page of said original electronic document.

6. The printing interface of claim 5 wherein said user interface enables said computer user to group pages of said copy of said original electronic document by manipulating said images of said pages of said copy of said electronic document.

7. The printing interface of claim 5 wherein a formatting change applied through said user interface is represented by an icon on said graphical display.

8. A printing interface for a computer system having an application program for creating an original electronic document having a plurality of pages and a printing device for producing printed output, said printing interface comprising:
   (a) a receiver receiving a copy of an original electronic document;
   (b) a converter to convert said copy of said original document to an intermediate metafile format; and
   (c) a user interface comprising a graphical display of an image for a plurality of pages of said original electronic document and enabling a computer user to apply formatting changes to less than all of said pages of said copy free from changing said original electronic document including grouping pages of said copy by manipulating said image and cause said printing device to print at least a portion of said copy with said formatting changes.

9. The printing interface of claim 8 wherein a page to which a formatting change has been applied through said user interface is represented by an icon on said graphical display.

10. A printing interface for a computer system having an application program for creating an original electronic document having a plurality of pages and a printing device for reproducing said electronic document as printed output, said printing interface comprising:
   (a) a receiver receiving a copy of said original electronic document; and
   (b) a user interface comprising a graphical display of an image for a plurality of pages of said original electronic document and enabling a computer user by manipulation of said image to apply formatting changes to said copy, free from changing said original electronic document, to cause said printing device to insert a blank page between two of said plurality of pages of said printed output.

11. The printing interface of claim 10 wherein a page to which a formatting change has been applied through said user interface is represented by an icon on said graphical display.

* * * * *

UNITED STATES PATENT AND TRADEMARK OFFICE
CERTIFICATE OF CORRECTION

PATENT NO. : 6,842,262 B1  
APPLICATION NO. : 09/149408  
DATED : January 11, 2005  
INVENTOR(S) : Thomas M. Gillihan and Larry Alan Westerman Page 1 of 1

It is certified that error appears in the above-identified patent and that said Letters Patent is hereby corrected as shown below:

Column 2, line 33  
Change "as it delivered" to --as it is delivered--

Column 2, line 47  
Change "it would necessary" to --it would be necessary--

Signed and Sealed this

Fifth Day of December, 2006

JON W. DUDAS  
*Director of the United States Patent and Trademark Office*